United States Patent
Nicklin et al.

(10) Patent No.: US 8,352,785 B1
(45) Date of Patent: Jan. 8, 2013

(54) METHODS FOR GENERATING A UNIFIED VIRTUAL SNAPSHOT AND SYSTEMS THEREOF

(75) Inventors: Jonathan Case Nicklin, Newburgh, MA (US); Harald Skardal, Nashua, NH (US)

(73) Assignee: F5 Networks, Inc., Seattle, WA (US)

( * ) Notice: Subject to any disclaimer, the term of this patent is extended or adjusted under 35 U.S.C. 154(b) by 54 days.

(21) Appl. No.: 12/334,281

(22) Filed: Dec. 12, 2008

Related U.S. Application Data

(60) Provisional application No. 61/013,539, filed on Dec. 13, 2007.

(51) Int. Cl.
*G06F 11/00* (2006.01)
(52) U.S. Cl. ............ 714/15; 714/6.2; 711/162; 707/649
(58) Field of Classification Search ...... 714/7; 711/162; 707/649
See application file for complete search history.

(56) References Cited

U.S. PATENT DOCUMENTS

| | | | |
|---|---|---|---|
| 4,993,030 A | 2/1991 | Krakauer et al. | |
| 5,218,695 A | 6/1993 | Noveck et al. | |
| 5,303,368 A | 4/1994 | Kotaki | |
| 5,473,362 A | 12/1995 | Fitzgerald et al. | |
| 5,511,177 A | 4/1996 | Kagimasa et al. | |
| 5,537,585 A | 7/1996 | Blickenstaff et al. | |
| 5,548,724 A | 8/1996 | Akizawa et al. | |
| 5,550,965 A | 8/1996 | Gabbe et al. | |
| 5,583,995 A | 12/1996 | Gardner et al. | |
| 5,586,260 A | 12/1996 | Hu | |
| 5,590,320 A | 12/1996 | Maxey | |
| 5,649,194 A | 7/1997 | Miller et al. | |
| 5,649,200 A | 7/1997 | Leblang et al. | |
| 5,668,943 A * | 9/1997 | Attanasio et al. | 714/7 |
| 5,692,180 A | 11/1997 | Lee | |
| 5,721,779 A | 2/1998 | Funk | |
| 5,724,512 A | 3/1998 | Winterbottom | |
| 5,806,061 A | 9/1998 | Chaudhuri et al. | |
| 5,832,496 A | 11/1998 | Anand et al. | |
| 5,832,522 A | 11/1998 | Blickenstaff et al. | |
| 5,838,970 A | 11/1998 | Thomas | |
| 5,862,325 A | 1/1999 | Reed et al. | |
| 5,884,303 A | 3/1999 | Brown | |

(Continued)

FOREIGN PATENT DOCUMENTS

AU 2003300350 A1 7/2004

(Continued)

OTHER PUBLICATIONS

"Auspex Storage Architecture Guide," Second Edition, 2001, Auspex Systems, Inc., www.ausoex.com, last accessed on Dec. 30, 2002.

(Continued)

*Primary Examiner* — Scott Baderman
*Assistant Examiner* — Jeison C Arcos
(74) *Attorney, Agent, or Firm* — LeClairRyan, a Professional Corporation

(57) ABSTRACT

A method, computer readable medium, and system for generating a unified virtual snapshot in accordance with embodiments of the present invention includes invoking with a file virtualization system a capture of a plurality of physical snapshots. Each of the physical snapshots comprises content at a given point in time in one of the plurality of data storage systems. A unified virtual snapshot is generated with the file virtualization system based on the captured plurality of the physical snapshots.

28 Claims, 11 Drawing Sheets

U.S. PATENT DOCUMENTS

| | | | |
|---|---|---|---|
| 5,893,086 A | 4/1999 | Schmuck et al. | |
| 5,897,638 A | 4/1999 | Lasser et al. | |
| 5,905,990 A | 5/1999 | Inglett | |
| 5,917,998 A | 6/1999 | Cabrera et al. | |
| 5,920,873 A | 7/1999 | Van Huben et al. | |
| 5,937,406 A | 8/1999 | Balabine et al. | |
| 5,999,664 A | 12/1999 | Mahoney et al. | |
| 6,012,083 A | 1/2000 | Savitzky et al. | |
| 6,029,168 A | 2/2000 | Frey | |
| 6,044,367 A | 3/2000 | Wolff | |
| 6,047,129 A | 4/2000 | Frye | |
| 6,072,942 A | 6/2000 | Stockwell et al. | |
| 6,078,929 A | 6/2000 | Rao | |
| 6,085,234 A | 7/2000 | Pitts et al. | |
| 6,088,694 A | 7/2000 | Burns et al. | |
| 6,128,627 A | 10/2000 | Mattis et al. | |
| 6,128,717 A | 10/2000 | Harrison et al. | |
| 6,161,145 A | 12/2000 | Bainbridge et al. | |
| 6,161,185 A | 12/2000 | Guthrie et al. | |
| 6,181,336 B1 | 1/2001 | Chiu et al. | |
| 6,202,156 B1 | 3/2001 | Kalajan | |
| 6,223,206 B1 | 4/2001 | Dan et al. | |
| 6,233,648 B1 | 5/2001 | Tomita | |
| 6,237,008 B1 * | 5/2001 | Beal et al. | 1/1 |
| 6,256,031 B1 | 7/2001 | Meijer et al. | |
| 6,282,610 B1 | 8/2001 | Bergsten | |
| 6,289,345 B1 | 9/2001 | Yasue | |
| 6,308,162 B1 | 10/2001 | Ouimet et al. | |
| 6,324,581 B1 | 11/2001 | Xu et al. | |
| 6,339,785 B1 | 1/2002 | Feigenbaum | |
| 6,349,343 B1 | 2/2002 | Foody et al. | |
| 6,374,263 B1 | 4/2002 | Bunger et al. | |
| 6,389,433 B1 | 5/2002 | Bolosky et al. | |
| 6,393,581 B1 | 5/2002 | Friedman et al. | |
| 6,397,246 B1 | 5/2002 | Wolfe | |
| 6,412,004 B1 | 6/2002 | Chen et al. | |
| 6,438,595 B1 | 8/2002 | Blumenau et al. | |
| 6,477,544 B1 | 11/2002 | Bolosky et al. | |
| 6,487,561 B1 | 11/2002 | Ofek et al. | |
| 6,493,804 B1 | 12/2002 | Soltis et al. | |
| 6,516,350 B1 | 2/2003 | Lumelsky et al. | |
| 6,516,351 B2 | 2/2003 | Borr | |
| 6,549,916 B1 | 4/2003 | Sedlar | |
| 6,553,352 B2 | 4/2003 | Delurgio et al. | |
| 6,556,997 B1 | 4/2003 | Levy | |
| 6,556,998 B1 | 4/2003 | Mukherjee et al. | |
| 6,601,101 B1 | 7/2003 | Lee et al. | |
| 6,606,663 B1 | 8/2003 | Liao et al. | |
| 6,612,490 B1 | 9/2003 | Herrendoerfer et al. | |
| 6,721,794 B2 | 4/2004 | Taylor et al. | |
| 6,738,790 B1 | 5/2004 | Klein et al. | |
| 6,742,035 B1 | 5/2004 | Zayas et al. | |
| 6,748,420 B1 | 6/2004 | Quatrano et al. | |
| 6,757,706 B1 | 6/2004 | Dong et al. | |
| 6,775,672 B2 | 8/2004 | Mahalingam et al. | |
| 6,775,673 B2 | 8/2004 | Mahalingam et al. | |
| 6,775,679 B2 | 8/2004 | Gupta | |
| 6,782,450 B2 | 8/2004 | Arnott et al. | |
| 6,801,960 B1 | 10/2004 | Ericson et al. | |
| 6,826,613 B1 | 11/2004 | Wang et al. | |
| 6,839,761 B2 | 1/2005 | Kadyk et al. | |
| 6,847,959 B1 | 1/2005 | Arrouye et al. | |
| 6,847,970 B2 | 1/2005 | Keller et al. | |
| 6,850,997 B1 | 2/2005 | Rooney et al. | |
| 6,871,245 B2 | 3/2005 | Bradley | |
| 6,889,249 B2 | 5/2005 | Miloushev et al. | |
| 6,922,688 B1 | 7/2005 | Frey, Jr. | |
| 6,934,706 B1 | 8/2005 | Mancuso et al. | |
| 6,938,039 B1 | 8/2005 | Bober et al. | |
| 6,938,059 B2 | 8/2005 | Tamer et al. | |
| 6,959,373 B2 | 10/2005 | Testardi | |
| 6,961,815 B2 | 11/2005 | Kistler et al. | |
| 6,973,455 B1 | 12/2005 | Vahalia et al. | |
| 6,973,549 B1 | 12/2005 | Testardi | |
| 6,985,936 B2 | 1/2006 | Agarwalla et al. | |
| 6,985,956 B2 | 1/2006 | Luke et al. | |
| 6,986,015 B2 | 1/2006 | Testardi | |
| 6,990,547 B2 | 1/2006 | Ulrich et al. | |
| 6,990,667 B2 | 1/2006 | Ulrich et al. | |
| 6,996,841 B2 | 2/2006 | Kadyk et al. | |
| 7,003,533 B2 | 2/2006 | Noguchi et al. | |
| 7,006,981 B2 | 2/2006 | Rose et al. | |
| 7,010,553 B2 | 3/2006 | Chen et al. | |
| 7,013,379 B1 | 3/2006 | Testardi | |
| 7,020,644 B2 | 3/2006 | Jameson | |
| 7,020,699 B2 | 3/2006 | Zhang et al. | |
| 7,024,427 B2 | 4/2006 | Bobbitt et al. | |
| 7,051,112 B2 | 5/2006 | Dawson | |
| 7,054,998 B2 | 5/2006 | Arnott et al. | |
| 7,072,917 B2 | 7/2006 | Wong et al. | |
| 7,089,286 B1 | 8/2006 | Malik | |
| 7,111,115 B2 | 9/2006 | Peters et al. | |
| 7,113,962 B1 | 9/2006 | Kee et al. | |
| 7,120,128 B2 | 10/2006 | Banks et al. | |
| 7,120,746 B2 | 10/2006 | Campbell et al. | |
| 7,127,556 B2 | 10/2006 | Blumenau et al. | |
| 7,133,967 B2 | 11/2006 | Fujie et al. | |
| 7,143,146 B2 | 11/2006 | Nakatani et al. | |
| 7,146,524 B2 | 12/2006 | Patel et al. | |
| 7,152,184 B2 | 12/2006 | Maeda et al. | |
| 7,155,466 B2 | 12/2006 | Rodriguez et al. | |
| 7,165,095 B2 | 1/2007 | Sim | |
| 7,167,821 B2 | 1/2007 | Hardwick et al. | |
| 7,171,496 B2 | 1/2007 | Tanaka et al. | |
| 7,173,929 B1 | 2/2007 | Testardi | |
| 7,194,579 B2 | 3/2007 | Robinson et al. | |
| 7,234,074 B2 | 6/2007 | Cohn et al. | |
| 7,280,536 B2 | 10/2007 | Testardi | |
| 7,284,150 B2 | 10/2007 | Ma et al. | |
| 7,293,097 B2 | 11/2007 | Borr | |
| 7,293,099 B1 | 11/2007 | Kalajan | |
| 7,293,133 B1 | 11/2007 | Colgrove et al. | |
| 7,343,398 B1 | 3/2008 | Lownsbrough | |
| 7,346,664 B2 | 3/2008 | Wong et al. | |
| 7,383,288 B2 | 6/2008 | Miloushev et al. | |
| 7,401,220 B2 | 7/2008 | Bolosky et al. | |
| 7,406,484 B1 | 7/2008 | Srinivasan et al. | |
| 7,415,488 B1 | 8/2008 | Muth et al. | |
| 7,415,608 B2 | 8/2008 | Bolosky et al. | |
| 7,440,982 B2 | 10/2008 | Lu et al. | |
| 7,457,982 B2 | 11/2008 | Rajan | |
| 7,467,158 B2 | 12/2008 | Marinescu | |
| 7,475,241 B2 | 1/2009 | Patel et al. | |
| 7,477,796 B2 | 1/2009 | Sasaki et al. | |
| 7,509,322 B2 | 3/2009 | Miloushev et al. | |
| 7,512,673 B2 | 3/2009 | Miloushev et al. | |
| 7,519,813 B1 | 4/2009 | Cox et al. | |
| 7,562,110 B2 | 7/2009 | Miloushev et al. | |
| 7,571,168 B2 | 8/2009 | Bahar et al. | |
| 7,574,433 B2 | 8/2009 | Engel | |
| 7,587,471 B2 | 9/2009 | Yasuda et al. | |
| 7,590,747 B2 | 9/2009 | Coates et al. | |
| 7,599,941 B2 | 10/2009 | Bahar et al. | |
| 7,610,307 B2 | 10/2009 | Havewala et al. | |
| 7,610,390 B2 | 10/2009 | Yared et al. | |
| 7,624,109 B2 | 11/2009 | Testardi | |
| 7,639,883 B2 | 12/2009 | Gill | |
| 7,644,109 B2 | 1/2010 | Manley et al. | |
| 7,653,699 B1 | 1/2010 | Colgrove et al. | |
| 7,689,596 B2 | 3/2010 | Tsunoda | |
| 7,694,082 B2 | 4/2010 | Golding et al. | |
| 7,711,771 B2 | 5/2010 | Kirnos | |
| 7,734,603 B1 | 6/2010 | McManis | |
| 7,743,035 B2 | 6/2010 | Chen et al. | |
| 7,752,294 B2 | 7/2010 | Meyer et al. | |
| 7,769,711 B2 | 8/2010 | Srinivasan et al. | |
| 7,788,335 B2 | 8/2010 | Miloushev et al. | |
| 7,822,939 B1 | 10/2010 | Veprinsky et al. | |
| 7,831,639 B1 | 11/2010 | Panchbudhe et al. | |
| 7,849,112 B2 | 12/2010 | Mane et al. | |
| 7,870,154 B2 | 1/2011 | Shitomi et al. | |
| 7,877,511 B1 | 1/2011 | Berger et al. | |
| 7,885,970 B2 | 2/2011 | Lacapra | |
| 7,913,053 B1 | 3/2011 | Newland | |
| 7,953,701 B2 | 5/2011 | Okitsu et al. | |
| 7,958,347 B1 | 6/2011 | Ferguson | |
| 8,005,953 B2 | 8/2011 | Miloushev et al. | |

| | | |
|---|---|---|
| 2001/0014891 A1 | 8/2001 | Hoffert et al. |
| 2001/0047293 A1 | 11/2001 | Waller et al. |
| 2001/0051955 A1 | 12/2001 | Wong |
| 2002/0035537 A1 | 3/2002 | Waller et al. |
| 2002/0059263 A1 | 5/2002 | Shima et al. |
| 2002/0065810 A1 | 5/2002 | Bradley |
| 2002/0073105 A1 | 6/2002 | Noguchi et al. |
| 2002/0083118 A1 | 6/2002 | Sim |
| 2002/0087887 A1 | 7/2002 | Busam et al. |
| 2002/0120763 A1 | 8/2002 | Miloushev et al. |
| 2002/0133330 A1 | 9/2002 | Loisey et al. |
| 2002/0133491 A1 | 9/2002 | Sim et al. |
| 2002/0138502 A1 | 9/2002 | Gupta |
| 2002/0143909 A1 | 10/2002 | Botz et al. |
| 2002/0147630 A1 | 10/2002 | Rose et al. |
| 2002/0150253 A1 | 10/2002 | Brezak et al. |
| 2002/0156905 A1 | 10/2002 | Weissman |
| 2002/0160161 A1 | 10/2002 | Misuda |
| 2002/0161911 A1 | 10/2002 | Pinckney, III et al. |
| 2002/0188667 A1 | 12/2002 | Kirnos |
| 2003/0009429 A1 | 1/2003 | Jameson |
| 2003/0012382 A1 | 1/2003 | Ferchichi et al. |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0061240 A1 | 3/2003 | McCann et al. |
| 2003/0065956 A1 | 4/2003 | Belapurkar et al. |
| 2003/0115218 A1 | 6/2003 | Bobbitt et al. |
| 2003/0115439 A1 | 6/2003 | Mahalingam et al. |
| 2003/0135514 A1 | 7/2003 | Patel et al. |
| 2003/0149781 A1 | 8/2003 | Yared et al. |
| 2003/0159072 A1 | 8/2003 | Bellinger et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0204635 A1 | 10/2003 | Ko et al. |
| 2004/0003266 A1 | 1/2004 | Moshir et al. |
| 2004/0006575 A1 | 1/2004 | Visharam et al. |
| 2004/0010654 A1 | 1/2004 | Yasuda et al. |
| 2004/0025013 A1 | 2/2004 | Parker et al. |
| 2004/0028043 A1 | 2/2004 | Maveli et al. |
| 2004/0028063 A1 | 2/2004 | Roy et al. |
| 2004/0030857 A1 | 2/2004 | Krakirian et al. |
| 2004/0054777 A1 | 3/2004 | Ackaouy et al. |
| 2004/0093474 A1* | 5/2004 | Lin et al. ............ 711/162 |
| 2004/0098383 A1 | 5/2004 | Tabellion et al. |
| 2004/0098595 A1 | 5/2004 | Aupperle et al. |
| 2004/0133573 A1 | 7/2004 | Miloushev et al. |
| 2004/0133577 A1 | 7/2004 | Miloushev et al. |
| 2004/0133606 A1 | 7/2004 | Miloushev et al. |
| 2004/0133607 A1 | 7/2004 | Miloushev et al. |
| 2004/0133652 A1 | 7/2004 | Miloushev et al. |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0181605 A1 | 9/2004 | Nakatani et al. |
| 2004/0199547 A1 | 10/2004 | Winter et al. |
| 2004/0236798 A1 | 11/2004 | Srinivasan et al. |
| 2005/0021615 A1 | 1/2005 | Arnott et al. |
| 2005/0050107 A1 | 3/2005 | Mane et al. |
| 2005/0091214 A1 | 4/2005 | Probert et al. |
| 2005/0108575 A1 | 5/2005 | Yung |
| 2005/0114291 A1 | 5/2005 | Becker-Szendy et al. |
| 2005/0114701 A1 | 5/2005 | Atkins et al. |
| 2005/0187866 A1 | 8/2005 | Lee |
| 2005/0189501 A1 | 9/2005 | Sato et al. |
| 2005/0246393 A1 | 11/2005 | Coates et al. |
| 2005/0289109 A1 | 12/2005 | Arrouye et al. |
| 2005/0289111 A1 | 12/2005 | Tribble et al. |
| 2006/0010502 A1 | 1/2006 | Mimatsu et al. |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0112151 A1 | 5/2006 | Manley et al. |
| 2006/0123062 A1 | 6/2006 | Bobbitt et al. |
| 2006/0161518 A1 | 7/2006 | Lacapra |
| 2006/0167838 A1 | 7/2006 | Lacapra |
| 2006/0179261 A1* | 8/2006 | Rajan ............ 711/162 |
| 2006/0184589 A1 | 8/2006 | Lees et al. |
| 2006/0190496 A1 | 8/2006 | Tsunoda |
| 2006/0200470 A1 | 9/2006 | Lacapra et al. |
| 2006/0212746 A1 | 9/2006 | Amegadzie et al. |
| 2006/0224687 A1 | 10/2006 | Popkin et al. |
| 2006/0230265 A1 | 10/2006 | Krishna |
| 2006/0242179 A1* | 10/2006 | Chen et al. ............ 707/100 |
| 2006/0259949 A1 | 11/2006 | Schaefer et al. |
| 2006/0271598 A1 | 11/2006 | Wong et al. |
| 2006/0277225 A1 | 12/2006 | Mark et al. |
| 2006/0282461 A1 | 12/2006 | Marinescu |
| 2006/0282471 A1* | 12/2006 | Mark et al. ............ 707/200 |
| 2007/0024919 A1 | 2/2007 | Wong et al. |
| 2007/0027929 A1 | 2/2007 | Whelan |
| 2007/0028068 A1 | 2/2007 | Golding et al. |
| 2007/0088702 A1 | 4/2007 | Fridella et al. |
| 2007/0136308 A1 | 6/2007 | Tsirigotis et al. |
| 2007/0208748 A1 | 9/2007 | Li |
| 2007/0209075 A1 | 9/2007 | Coffman |
| 2007/0226331 A1 | 9/2007 | Srinivasan et al. |
| 2008/0046432 A1* | 2/2008 | Anderson et al. ............ 707/8 |
| 2008/0070575 A1 | 3/2008 | Claussen et al. |
| 2008/0104443 A1 | 5/2008 | Akutsu et al. |
| 2008/0209073 A1 | 8/2008 | Tang |
| 2008/0222223 A1 | 9/2008 | Srinivasan et al. |
| 2008/0243769 A1 | 10/2008 | Arbour et al. |
| 2008/0282047 A1 | 11/2008 | Arakawa et al. |
| 2009/0007162 A1 | 1/2009 | Sheehan |
| 2009/0037975 A1 | 2/2009 | Ishikawa et al. |
| 2009/0041230 A1 | 2/2009 | Williams |
| 2009/0055607 A1* | 2/2009 | Schack et al. ............ 711/162 |
| 2009/0077097 A1* | 3/2009 | Lacapra et al. ............ 707/10 |
| 2009/0089344 A1 | 4/2009 | Brown et al. |
| 2009/0094252 A1 | 4/2009 | Wong et al. |
| 2009/0106255 A1* | 4/2009 | Lacapra et al. ............ 707/10 |
| 2009/0106263 A1 | 4/2009 | Khalid et al. |
| 2009/0132616 A1 | 5/2009 | Winter et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0254592 A1 | 10/2009 | Marinov et al. |
| 2010/0211547 A1* | 8/2010 | Kamei et al. ............ 707/649 |
| 2011/0087696 A1 | 4/2011 | Lacapra |

FOREIGN PATENT DOCUMENTS

| | | |
|---|---|---|
| CA | 2512312 A1 | 7/2004 |
| EP | 0 738 970 A | 10/1996 |
| JP | 63010250 A | 1/1988 |
| JP | 6-332782 A | 12/1994 |
| JP | 08-328760 A | 12/1996 |
| JP | 08-339355 | 12/1996 |
| JP | 9016510 A | 1/1997 |
| JP | 11282741 A1 | 10/1999 |
| NZ | 566291 A | 12/2008 |
| WO | WO 02/056181 A3 | 7/2002 |
| WO | WO 2004/061605 A2 | 7/2004 |
| WO | WO 2008/130983 A1 | 10/2008 |
| WO | WO 2008/147973 A2 | 12/2008 |

OTHER PUBLICATIONS

"CSA Persistent File System Technology, Colorado Software" Architecture, Inc. White Paper, Jan. 1999, p. 1-3.

"Distributed File System: A Logical View of Physical Storage : White Paper," 1999, Microsoft Corp., www.microsoft.com, last accessed on Dec. 20, 2002.

"How DFS Works: Remote File Systems," Distributed File System (DFS) Technical Reference, retrieved from the Internet on Feb. 13, 2009: URL:http://technelmicrosoft.com/en-us/library/cc782417.aspx> (Mar. 2003).

"NERSC Tutorials: I/O on the Cray T3E," chapter 8, "Disk Striping," National Energy Research Scientific Computing Center (NERSC), http://hpcf.nersc.gov, last accessed on Dec. 27, 2002.

"Scaling Next Generation Web Infrastructure with Content-Intelligent Switching : White Paper," Apr. 2000, Alteon WebSystems, Inc., (now Nortel Networks).

"VERITAS SANPoint Foundation Suite(tm) and SANPoint Foundation(tm) Suite HA: New VERITAS Volume Management and File System Technology for Cluster Environments," Sep. 2001, VERITAS Software Corp.
"Windows Clustering Technologies—An Overview," Nov. 2000, Microsoft Corp., www.microsoft.com, last accessed on Dec. 30, 2002.
Aguilera et al., "Improving Recoverability in Multi-Tier Storage Systems," International Conference on Dependable Systems and Networks (DSN-2007), Edinburgh, Scotland, Jun. 2007, 10 pages.
Anderson et al., "Interposed Request Routing for Scalable Network Storage," ACM Transactions on Computer Systems 20(1):1-24 (Feb. 2002).
Anderson et al., "Serverless Network File System," in the 15th Symposium on Operating Systems Principles, Dec. 1995, Association for Computing Machinery, Inc.
Apple, Inc. "Tiger Developer Overview Series: Working with Spotlight" Nov. 23, 2004, www.apple.com using www.archive.org <http://web.archive.org/web/20041123005335/developer.apple.com/macosx/tiger/spotlight.html>, pp. 1-6.
Cabrera et al, "Using Data Striping in a Local Area Network," 1992, technical report No. UCSC-CRL-92-09 of the Computer & Information Sciences Department of University of California at Santa Cruz.
Cabrera et al., "Swift: A Storage Architecture for Large Objects," Proceedings of the Eleventh IEEE Symposium on Mass Storage Systems, pp. 123-428, Oct. 1991.
Cabrera et al., "Swift: Using Distributed Disk Striping to Provide High I/O Data Rates," Computing Systems 4, 4 (Fall 1991), pp. 405-436.
Callaghan et al., "NFS Version 3 Protocol Spcification," (RFC 1813), 1995, The Internet Engineering Task Force (IETF), www.ietf.org, last accessed on Dec. 30, 2002.
Carns et al., "PVFS: A Parallel File System for Linux Clusters," Proceedings of the 4th Annual Linux Showcase and Conference, pp. 317-327, Atlanta, Georgia, Oct. 2000, USENIX Association.
Cavale, M. R., "Introducing Microsoft Cluster Service (MSCS) in the Windows Server 2003," Microsoft Corporation, Nov. 2002.
English Translation of Notification of Reason(s) for Refusal for JP 2002-556371 (Dispatch Date: Jan. 22, 2007).
Fan, et al., Summary Cache: A Scalable Wide—Area Web Cache Sharing Protocol, Computer Communications Review, Association for Computing Machinery, New York, USA 28(4):254-265 (1998).
Farley, "Building Storage Networks," Jan. 2000, McGraw-Hill, ISBN 0072120509.
Gibson et al., "File Server Scaling with Network-Attached Secure Disks," in Proceedings of the ACM International Conference on Measurement and Modeling of Computer Systems (Sigmetrics '97), 1997, Association for Computing Machinery, Inc.
Gibson et al., "NASD Scalable Storage Systems," Jun. 1999, USENIX99, Extreme Linux Workshop, Monterey, California.
Hartman, "The Zebra Striped Network File System," 1994, Ph.D. dissertation submitted in the Graduate Division of the University of California at Berkeley.
Haskin et al., "The Tiger Shark File System," 1995, in proceedings of IEEE, Spring COMPCON, Santa Clara, CA, www.research.ibm.com, last accessed on Dec. 30, 2002.
Hwang et al., Designing SSI Clusters with Hierarchical Checkpointing and Single I/O Space, IEEE Concurrency, pp. 60-69, Jan.-Mar. 1999.
International Search Report for International Patent Application No. PCT/US02/00720 (Jul. 8, 2004).
International Search Report for International Patent Application No. PCT/US03/41202 (Sep. 15, 2005).
International Search Report for International Patent Application No. PCT/US2008/060449 (Apr. 9, 2008).
International Search Report for International Patent Application No. PCT/US2008/064677 (Sep. 6, 2009).
International Search Report for International Patent Application No. PCT/US2008/083117 (Jun. 23, 2009).
Karamanolis et al., "An Architecture for Scalable and Manageable File Services," HPL-2001-173 p. 1-14 (Jul. 26, 2001).
Katsurashima et al., "NAS Switch: A Novel CIFS Server Virtualization," Proceedings. 20th IEEE/11th NASA Goddard Conference on Mass Storage Systems and Technologies, 2003 (MSST 2003) (Apr. 2003).
Kimball, C.E. et al., Automated Client-Side Integration of Distributed Application Servers, 13th LISA Conf. (1999).
Kohl et al., "The Kerberos Network Authentication Service (V5)," RFC 1510, Sep. 1993. (http://www.ietf.org/rfc/rfc1510.txt?number=1510.
Long et al., "Swift/RAID: A distributed RAID system," Computing Systems, vol. 7, pp. 333-359, Summer 1994.
Noghani et al.,"A Novel Approach to reduce Latency on the Internet: 'Component-Based Download', " Proceedings of the Int'l Conf. on Internet Computing, Las Vegas, NV pp. 1-6 (2000).
Norton et al., "CIFS Protocol Version CIFS-Spec 0.9," 2001, Storage Networking Industry Association (SNIA), www.snia.org, last accessed on Mar. 26, 2001.
Patterson et al., "A case for redundant arrays of inexpensive disks (RAID)," Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.
Pearson, P.K., "Fast Hashing of Variable-Length Text Strings," Comm. of the ACM, vol. 33, No. 6, Jun. 1990.
Peterson, "Introducing Storage Area Networks," Feb. 1998, InfoStor, www.infostor.com, last accessed on Dec. 20, 2002.
Preslan et al., "Scalability and Failure Recovery in a Linux Cluster File System," in Proceedings of the 4th Annual Linux Showcase & Conference, Atlanta, Georgia, Oct. 10-14, 2000, www.usenix.org, last accessed on Dec. 20, 2002.
Rodriguez et al., "Parallel-access for Mirror Sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph p. 868, col. 1, paragraph 1.
Rsync, "Welcome to the RSYNC Web Pages," Retrieved from the Internet URL: http://samba.anu.edu.au/rsync/ (Retrieved Dec. 18, 2009).
Savage, et al., "AFRAID—A Frequently Redundant Array of Inexpensive Disks," 1996 USENIX Technical Conf., San Diego, California, Jan. 22-26, 1996.
Soltis et al., The Design and Performance of Shared Disk File System for IRIX, 6th NASA Goddard Space Flight Center Conf. on Mass Storage & Technologies, IEEE Symposium on Mass Storage Systems, p. 1-17 (Mar. 1998).
Sorenson, K.M., "Installation and Administration: Kimberlite Cluster Version 1.1.0, Rev. D." Mission Critical Linux, (Dec. 2000) http://oss.missioncriticallinux.com/kimberlite/kimberlite.pdf.
Stakutis, "Benefits of SAN-based file system sharing," Jul. 2000, InfoStor, www.infostor.com, last accessed on Dec. 30, 2002.
Thekkath et al., "Frangipani: A Scalable Distributed File System," in Proceedings of the 16th ACM Symposium on Operating Systems Principles, Oct. 1997, Association for Computing Machinery, Inc.
Wilkes, J., et al., "The HP AutoRAID Hierarchical Storage System," ACM Transactions on Computer Systems, vol. 14, No. 1, Feb. 1996.
Zayas, "AFS-3 Programmer's Reference: Architectural Overview," Transarc Corp., version 1.0 of Sep. 2, 1991, doc. No. FS-00-D160.
"The AFS File System in Distributed Computing Environment," www.transarc.ibm.com/Library/whitepapers/AFS/afsoverview.html, last accessed on Dec. 20, 2002.
Basney et al., "Credential Wallets: A Classification of Credential Repositories Highlighting MyProxy," Sep. 19-21, 2003, pp. 1-20, 31st Research Conference on Communication, Information and Internet Policy (TPRC 2003), Arlington, Virginia.
Botzum, Keys, "Single Sign On—A Contrarian View," Aug. 6, 2001, pp. 1-8, Open Group Website, http://www.opengroup.org/security/topics.htm.
Harrison, C., May 19, 2008 response to Communication pursuant to Article 96(2) EPC dated Nov. 9, 2007 in corresponding European patent application No. 02718824.2.
Hu, J., Final Office action dated Sep. 21, 2007 for related U.S. Appl. No. 10/336,784.
Hu, J., Office action dated Feb. 6, 2007 for related U.S. Appl. No. 10/336,784.

Klayman, J., Nov. 13, 2008 e-mail to Japanese associate including instructions for response to office action dated May 26, 2008 in corresponding Japanese patent application No. 2002-556371.

Klayman, J., Response filed by Japanese associate to office action dated Jan. 22, 2007 in corresponding Japanese patent application No. 2002-556371.

Klayman, J., Jul. 18, 2007 e-mail to Japanese associate including instructions for response to office action dated Jan. 22, 2007 in corresponding Japanese patent application No. 2002-556371.

Korkuzas, V., Communication pursuant to Article 96(2) EPC dated Sep. 11, 2007 in corresponding European patent applicaiton No. 02718824.2-2201.

Lelil, S., "Storage Technology News: AutoVirt adds tool to help data migration projects," Feb. 25, 2011, last accessed Mar. 17, 2011, <http://searchstorage.techtarget.com/news/article/0,289142,sid5_gci1527986,00.html>.

Novotny et al., "An Online Credential Repository for the Grid: MyProxy," 2001, pp. 1-8.

Pashalidis et al., "A Taxonomy of Single Sign-On Systems," 2003, pp. 1-16, Royal Holloway, University of London, Egham Surray, TW20, 0EX, United Kingdom.

Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004.Royal Holloway, University of London.

Response filed Jul. 6, 2007 to Office action dated Feb. 6, 2007 for related U.S. Appl. No. 10/336,784.

Response filed Mar. 20, 2008 to Final Office action dated Sep. 21, 2007 for related U.S. Appl. No. 10/336,784.

Soltis et al., "The Global File System," Sep. 17-19, 1996, in Proceedings of the Fifth NASA Goddard Space Flight Center Conference on Mass Storage Systems and Technologies, College Park, Maryland.

Tulloch, Mitch, "Microsoft Encyclopedia of Security," 2003, pp. 218, 300-301, Microsoft Press, Redmond, Washington.

Uesugi, H., Nov. 26, 2008 amendment filed by Japanese associate in response to office action dated May 26, 2008 in corresponding Japanese patent application No. 2002-556371.

Uesugi, H., English translation of office action dated May 26, 2008 in corresponding Japanese patent application No. 2002-556371.

Uesugi, H., Jul. 15, 2008 letter from Japanese associate reporting office action dated May 26, 2008 in corresponding Japanese patent application No. 2002-556371.

* cited by examiner

| VIRTUAL SNAPSHOT CONFIGURATION RECORD |
|---|
| VIRTUAL SNAPSHOT NAME: "test-vsnap-1" |
| DATE: DECEMBER 1, 2006 |
| VIRTUAL VOLUME: "/jcn-unix" |
| TOTAL MEMBERS: 3 |
| THIS MEMBER: 1 |

| |
|---|
| FILER NAME: DS1 |
| MEMBER IDENTIFICATION: 1 |
| MEMBER IP ADDRESS: 10.55.1.1 |
| PHYSICAL SNAP NAME: "psnap-1-december-1-2006" |
| MEMBER SHARE: "/jcn-unix/virtualize-me-1" |
| CONTAINS: USER DATA |

| |
|---|
| FILER NAME: DS2 |
| MEMBER IDENTIFICATION: 2 |
| IP ADDRESS: 10.55.1.2 |
| PHYSICAL SNAP NAME: "psnap-2-december-1-2006" |
| PHYSICAL SHARE: "/jcn-unix/virtualize-me-1" |
| CONTAINS: USER DATA |

| |
|---|
| FILER NAME: MD1 |
| MEMBER IDENTIFICATION: 3 |
| IP ADDRESS: 10.55.1.3 |
| PHYSICAL SNAP NAME: "psnap-3-december-1-2006" |
| PHYSICAL SHARE: "/metadata-storage/jcn-unix" |
| CONTAINS: METADATA |

*FIG. 6*

METHODS FOR GENERATING A UNIFIED VIRTUAL SNAPSHOT AND SYSTEMS THEREOF

This application claims the benefit of U.S. Provisional Patent Application Ser. No. 61/013,539, filed Dec. 13, 2007, which is herein incorporated by reference in its entirety.

FIELD OF THE INVENTION

This invention relates generally to methods and systems for capturing snapshots of file systems and, more particularly, to methods for generating a unified virtual snapshot from a plurality of physical snapshots of a heterogeneous network storage system and systems thereof.

BACKGROUND

Often files and associated data in computer systems are remotely stored on one or more network storage devices. In anticipation of a possible restore request from a user computer system coupled to a network storage device, a physical snapshot of the content in the network storage device may be captured at a recorded time. If the user computer system has a need for and requests a restore, the captured physical snapshot can be used to recover contents from the network storage device as of the recorded time.

File virtualization systems provide methods for managing and presenting a plurality of network storage devices as a single, unified file system. Basically, file virtualization decouples the presentation of a file system from its' physical composition. Unfortunately, when file virtualization is implemented, there is no method or system for generating and providing a unified virtual snapshot in a heterogeneous storage network system.

SUMMARY

A method for generating a unified virtual snapshot in accordance with embodiments of the present invention includes invoking with a file virtualization system a capture of a plurality of physical snapshots. Each of the physical snapshots comprises content at a given point in time in one of the plurality of data storage systems. A unified virtual snapshot is generated with the file virtualization system based on the captured plurality of the physical snapshots.

A computer readable medium having stored thereon instructions for methods for generating a unified virtual snapshot in accordance with other embodiments of the present invention comprising machine executable code which when executed by at least one processor, causes the processor to perform steps including invoking with a file virtualization system a capture of a plurality of physical snapshots. Each of the physical snapshots comprises content at a given point in time in one of the plurality of data storage systems. A unified virtual snapshot is generated with the file virtualization system based on the captured plurality of the physical snapshots.

A system that generates a unified virtual snapshot in accordance with other embodiments of the present invention includes an invocation system and a virtual snapshot system in a file virtualization system. The invocation system invokes a capture of a plurality of physical snapshots. Each of the physical snapshots comprises content in one of the plurality of data storage systems at a given point in time. The virtual snapshot system generates a unified virtual snapshot based on the captured plurality of the physical snapshots.

The present invention provides a number of advantages including providing a unified virtual snapshot from a plurality of physical snapshots of contents of file systems distributed across several independent, network storage devices. Additionally, the present invention provides a method and system which enables the use of snapshots in environments that implement file virtualization. Further, the present invention captures and generates snapshots which can be utilized to re-assemble contents of file systems with or without the file virtualization system.

BRIEF DESCRIPTION OF THE DRAWINGS

FIG. 6 is a diagram of an example of a virtual snapshot configuration record.

DETAILED DESCRIPTION

Figure 1:
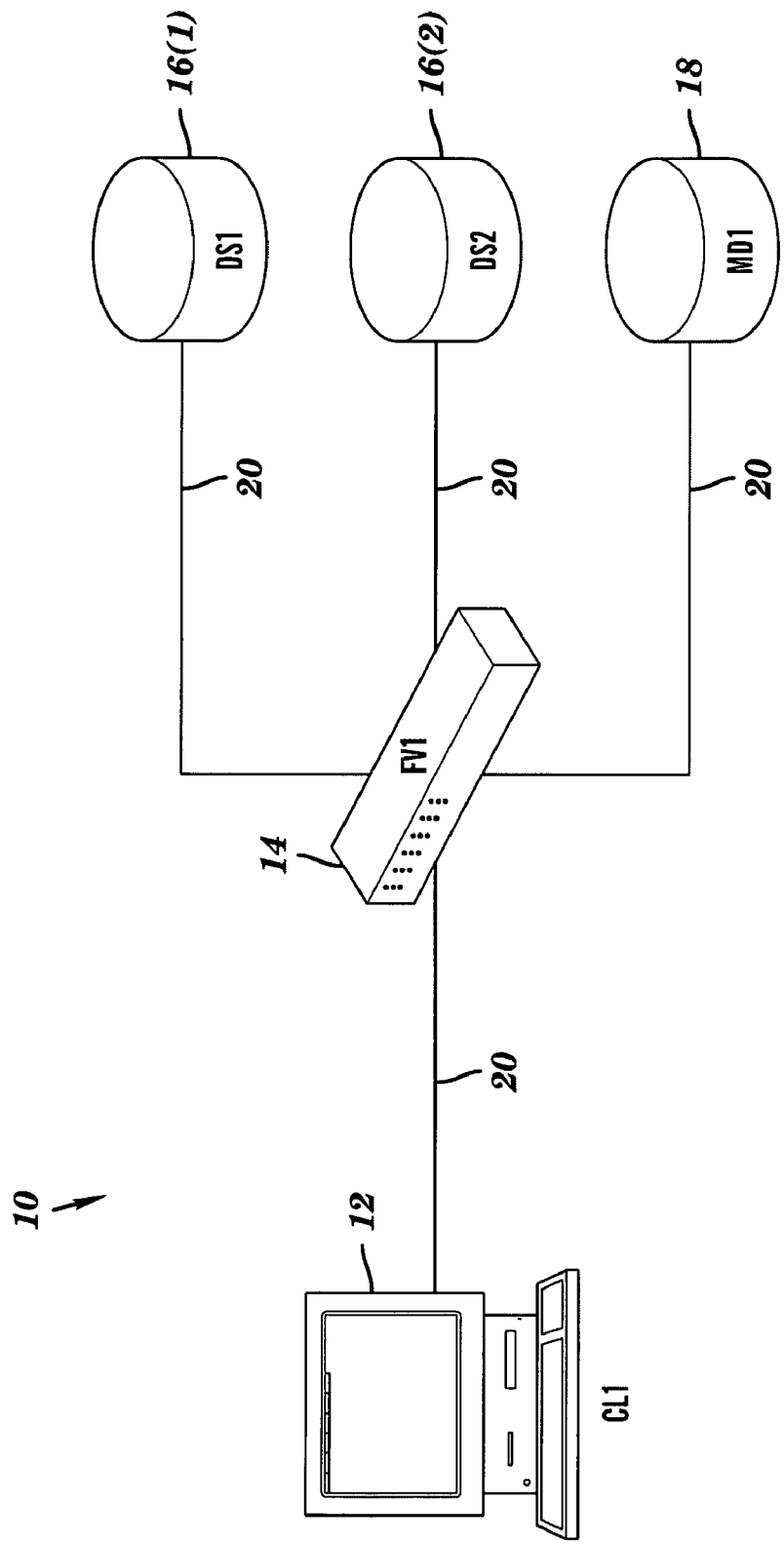
FIG. 1 is a block diagram of an example of a system that generates and uses a virtual snapshot from a plurality of physical snapshots of a heterogeneous network storage system.

An example of a system 10 that generates and uses a virtual snapshot of a heterogeneous network storage system is illustrated in FIG. 1, although the present invention can be utilized in homogeneous network storage systems with one or more storage devices. This system 10 includes a client system 12, a file virtualization system 14, data storage systems 16(1) and 16(2), and metadata storage system 18, although this system 10 can include other numbers and types of systems, devices, equipment, parts, components, and/or elements in other configurations. The present invention provides a number of advantages including providing a unified virtual snapshot from a plurality of physical snapshots of contents of file systems distributed across several independent, network storage devices.

Referring more specifically to FIG. 1, the client system 12 utilizes the file virtualization system 14 to conduct one or more operations with one or more of the data storage systems 16(1), 16(2), and 18, such as to store a file, delete a file, create a file, and restore a file by way of example only, although other numbers and types of network systems could be utilizing these resources and other types and numbers of functions could be performed. The client system 12 includes a central processing unit (CPU) or processor, a memory, user input device, a display, and an interface system, and which are coupled together by a bus or other link, although the client system 12 can include other numbers and types of components, parts, devices, systems, and elements in other configurations. The processor in the client system 12 executes a program of stored instructions as described and illustrated herein, although the processor could execute other numbers and types of programmed instructions.

The memory in the client system 12 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory in the client system 12.

The user input device in the client system 12 is used to input selections, such as to store a file, delete a file, create a file, and restore a file, although the user input device could be used to input other types of data and interact with other elements. The user input device can include a computer keyboard and a computer mouse, although other types and numbers of user input devices can be used. The display in the client system 12 is used to display information, such as a file or directory, although other types and amounts of information can be displayed in other manners. The display can include a computer display screen, such as a CRT or LCD screen, although other types and numbers of displays could be used.

The interface system in the client system 12 is used to operatively couple and communicate between the client system 12 and the file virtualization system 14 via a communications network 20, although other types and numbers of communication networks or systems with other types and numbers of configurations and connections to other systems and devices can be used.

The file virtualization system 14 manages file virtualization and the generation of unified virtual snapshots, although other numbers and types of systems can be used and other numbers and types of functions can be performed. The file virtualization system 14 includes a central processing unit (CPU) or processor, a memory, and an interface system which are coupled together by a bus or other link, although other numbers and types of components, parts, devices, systems, and elements in other configurations and locations can be used. The processor in the file virtualization system 14 executes a program of stored instructions for one or more aspects of the present invention as described and illustrated by way of the embodiments herein, such as managing file virtualization and the generation of unified virtual snapshots, although the processor in file virtualization system 14 could execute other numbers and types of programmed instructions.

The memory in the file virtualization system 14 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to one or more processors, can be used for the memory in the file virtualization system 14.

The interface system in the file virtualization system 14 is used to operatively couple and communicate between the file virtualization system 14 and the client system 12, the data storage system 16(1), the data storage system 16(2), and the metadata storage system 18 via the communications networks 20, although other types and numbers of communication networks or systems with other types and numbers of connections and configurations can be used.

Each of the data storage systems 16(1) and 16(2) is a network storage device for files, directories, and other data, although other numbers and types of storage systems which could have other numbers and types of functions and store other data could be used. In this example, data storage system 16(1) is a different type of storage device, e.g. different make and/or model, from the data storage system 16(2) to form a heterogeneous network storage system, although the present invention can work with other numbers and types of storage systems, such as a homogeneous system.

Each of the data storage systems 16(1) and 16(2) include a central processing unit (CPU) or processor, a memory, and an interface system which are coupled together by a bus or other link, although other numbers and types of components, parts, devices, systems, and elements in other configurations can be used. By way of example only, the storage systems may not have their own separate processing capabilities. In this example, the specialized processor in each of the data storage systems 16(1) and 16(2) executes a program of stored instructions for one or more aspects of the present invention as described and illustrated by way of the embodiments herein, such as to capture a physical snapshot by way of example only, although the processor in each of the data storage system could execute other numbers and types of programmed instructions.

The memory in each of the data storage systems 16(1) and 16(2) store these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to one or more processors, can be used for the memory in each of the data storage systems 16(1) and 16(2).

The interface system in the data storage system 16(1) and the interface in the data storage system 16(2) are each used to operatively couple and communicate between the data storage system 16(1) and the file virtualization system 14 and between the data storage system 16(2) and the file virtualization system 14 via communication network 20, although other types and numbers of communication networks or systems with other types and numbers of configurations and connections to other systems and devices can be used.

The metadata storage system 18 is another type of network storage device to store and manage global file virtualization metadata from data storage systems 16(1) and 16(2), although other numbers and types of storage systems which could have other numbers and types of functions, which is connected in other manners, and which could store other types of data and information could be used. In this particular example, the metadata storage system 18 is external to the file virtualization system 14, although the metadata storage 18 could be located in the file virtualization system 14. The metadata storage system 18 includes a central processing unit (CPU) or processor, a memory, and an interface system which are coupled together by a bus or other link, although other numbers and types of components, parts, devices, systems, and elements in other configurations can be used for the storage system. By way of example only, the storage system may not have its own separate processing capabilities. In this example, the specialized processor in the metadata storage system 18 executes a program of stored instructions for one or more aspects of the present invention as described and illustrated by way of the embodiments herein, although the processor in metadata storage system 18 could execute other numbers and types of programmed instructions.

The memory in the metadata storage system 18 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor in the metadata storage system 18.

The interface system in the metadata storage system 18 is used to operatively couple and communicate between the metadata storage system 18 and the file virtualization system 14 via the communications network 20, although other types and numbers of communication networks or systems with other types and numbers of configurations and connections to other systems and devices can be used.

Although embodiments of the client system 12, the file virtualization system 14, the data storage systems 16(1) and 16(2), and the metadata storage system 18 are described herein, each of these systems can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

An overview of the present invention is set forth below. With this example of the present invention, a file virtualization layer (FV1) provided by file virtualization system 14 exists between the application in client system 12 or CL1 and the data storage systems 16(1) and 16(2) (also referred to as DS1 and DS2), although other numbers and types of client systems and storage systems could be used. This file virtualization layer provided by file virtualization system 14 manages metadata in data storage 18 that tracks the location of files and directories that are distributed across data storage systems 16(1) and 16(2) in this particular example.

To generate or create a unified virtual snapshot, file virtualization system 14 erects an I/O barrier to substantially suspend data storage communications between client system 12 and data storage systems 16(1) and 16(2) and metadata storage system 18. This suspension permits either an administrator or application at client system 12 or file virtualization system 14 to request or invoke a capture of physical snapshots of content on data storage systems 16(1) and 16(2) and metadata storage system 18 using an application programming interface (API) or command line interface (CLI), although other manners for invoking a capture of physical snapshots, such as a periodic automated invocation could be used. Once all of the physical snapshots have been captured or otherwise completed by file virtualization system 14, the unified virtual snapshot is generated by file virtualization system 14 and the I/O barrier is removed to allow storage data communications to resume. The unified virtual snapshot comprises the captured physical snapshots which are mapped together by file virtualization system 14 to form the virtual snapshot.

In this example, the I/O barrier is implemented by the file virtualization system 14 at the application protocol level, such as NFS or CIFS by way of example, although the I/O barrier could be implemented in other manners. Packets are accepted at a transport level, such as UDP or TCP by way of example, but are not proxied by file virtualization system 14 to the data storage systems 16(1) and 16(2) and traffic to the metadata storage system 18 is halted while the I/O barrier is asserted. As implemented, the barrier operation is substantially transparent to the operator at the client system 12 and at most the file system seems momentarily slow, although system can be arranged in other manners, such as to provide notice of the implementation of the barrier if desired.

To create a persistent record of the location of files and directories in physical snapshots, once the I/O barrier is asserted and before a physical snapshot occurs the file virtualization system 14 initiates copying or writing of a virtual snapshot configuration record into data storage systems 16(1) and 16(2) and metadata storage system 18. The virtual snapshot configuration record is a unique record written in each of the data storage systems 16(1) and 16(2) and metadata storage system 18 that allows an operator or program to locate components, e.g. a file of a virtual snapshot, although other types and amounts of information could be included. More specifically, the snapshot configuration record records the members of a unified virtual snapshot, i.e. in this particular example the members are data storage systems 16(1) and 16(2) and metadata storage system 18, although the snapshot configuration record can store other types and amounts of data. By way of example only, a virtual snapshot configuration record is illustrated in FIG. 6. In this example, the virtual snapshot configuration records are made unique by a field in the header of each record, although other manners for providing a unique identifier can be used.

The virtual snapshot configuration record is included in the physical snapshots to aid in recovery. With the snapshot configuration record and the stored metadata on the file virtualization system 14, the file virtualization system 14 can locate a particular file or directory. Additionally, by including the virtual snapshot configuration record in the physical snapshot, an external application that knows the format of the stored metadata can use that metadata and the snapshot configuration record to locate a file without file virtualization.

Once a unique virtual snapshot configuration record is copied to each data storage systems 16(1) and 16(2) and metadata storage system 18, the data storage systems 16(1) and 16(2) and metadata storage system 18 are invoked by file virtualization system 14 to capture physical snapshots which will contain this virtual snapshot configuration record, although the data storage systems 16(1) and 16(2) and metadata storage system 18 can be invoked to capture physical snapshots by other systems in other manners. The data storage systems 16(1) and 16(2) and metadata storage system 18 take a physical snapshot in response to this invocation.

Figure 7:
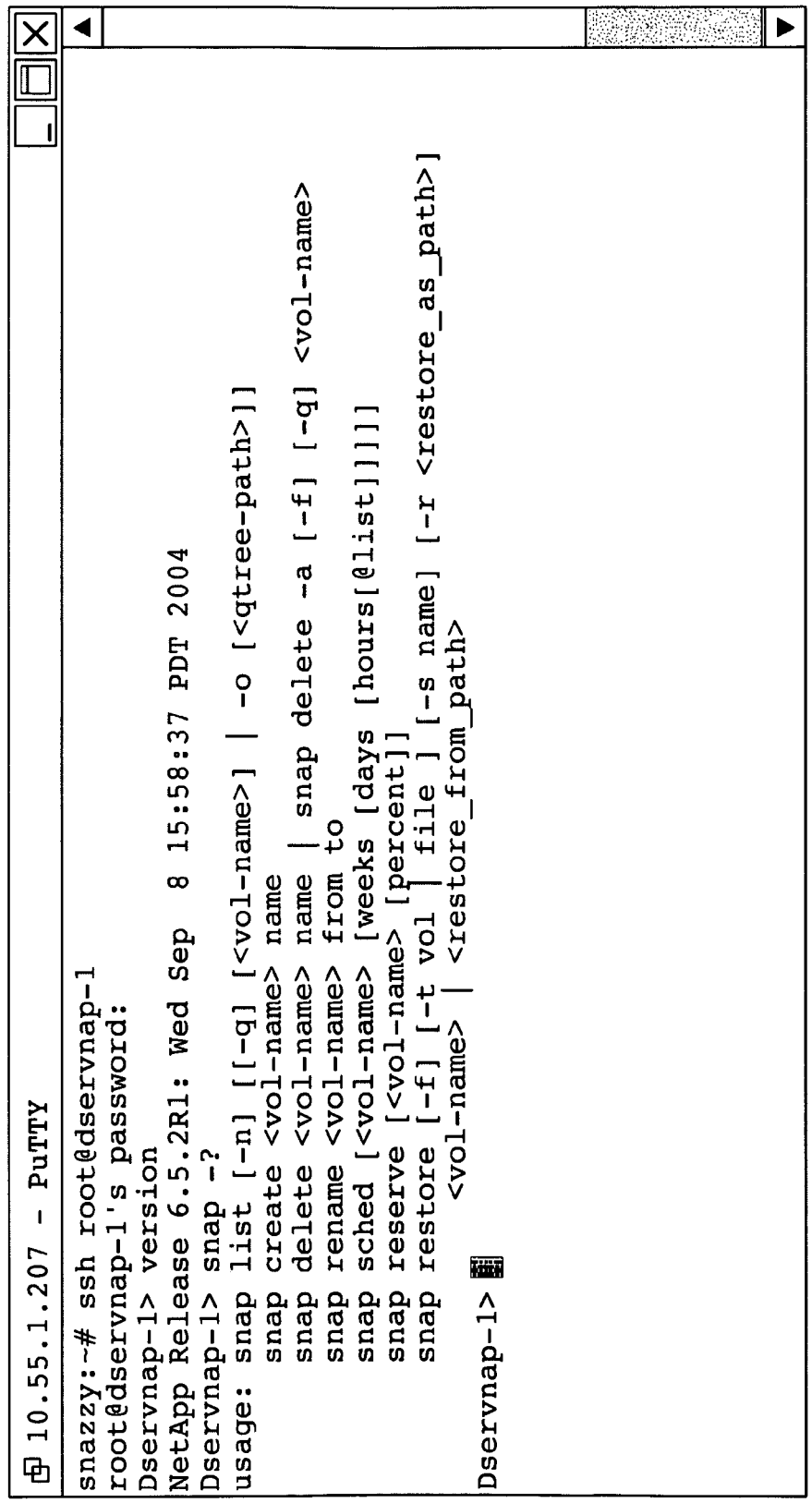
FIG. 7 is a diagram of an example of a snapshot command on a network storage device.

By way of example only, a snapshot command which can be used by data storage systems 16(1) and 16(2) and metadata storage system 18 is illustrated in FIG. 7, although other types of commands could be used. Again, this method effectively embeds the unique virtual snapshot configuration record into each of the physical snapshots themselves.

Generation of unified virtual snapshots is implemented by the file virtualization layer in file virtualization system 14, although the generation can be implemented by other systems. Virtual directories are dynamically created that contain a list of available virtual snapshots at different points in time in file virtualization system 14. Each virtual snapshot subdirectory contains files and directories that exist in the physical snapshots of the contents of the file systems on data storage systems 16(1) and 16(2) and metadata storage system 18 in this example.

Figure 2A:
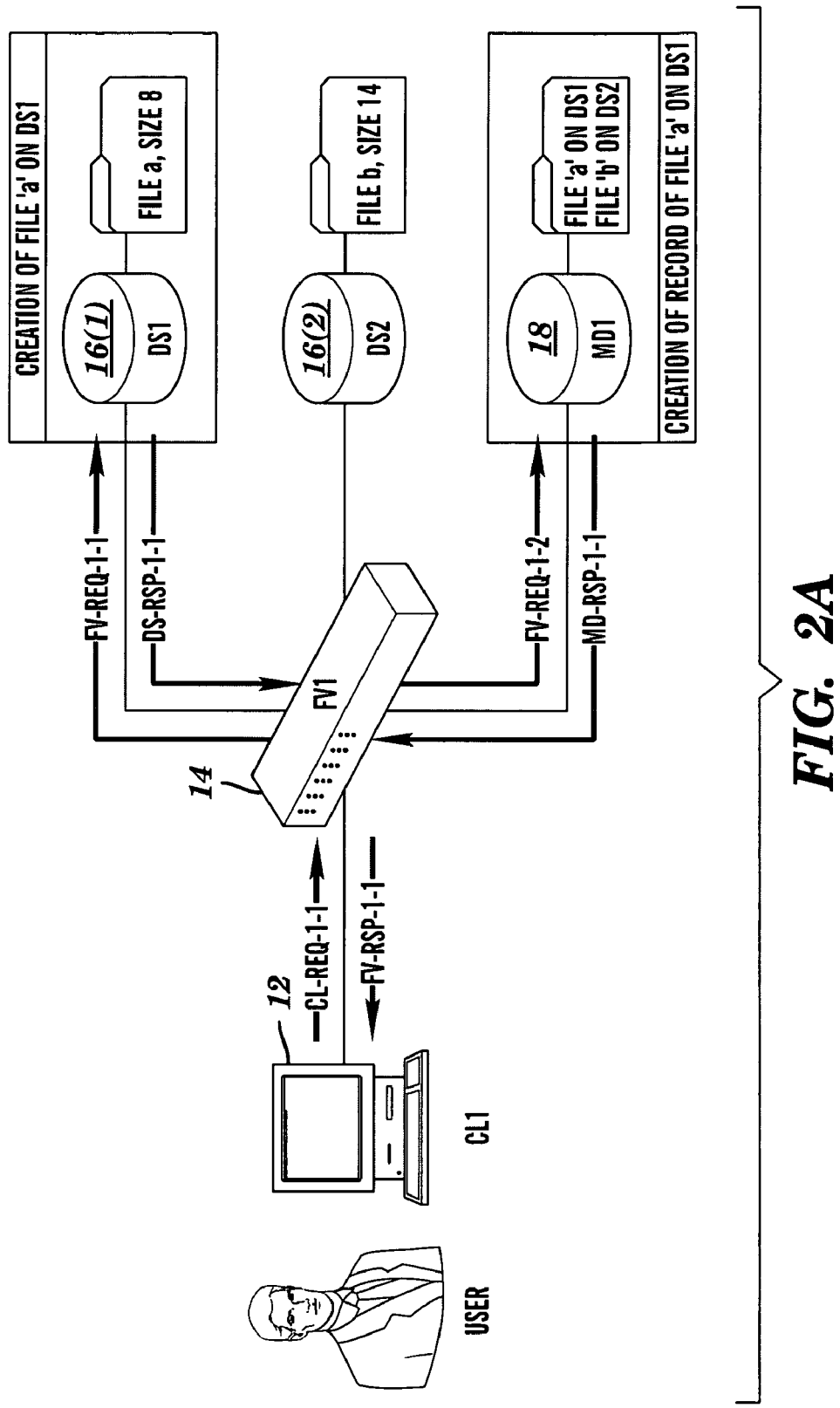
FIG. 2A is a functional block diagram of an example of a method for processing requests with file virtualization.
Figure 2B:
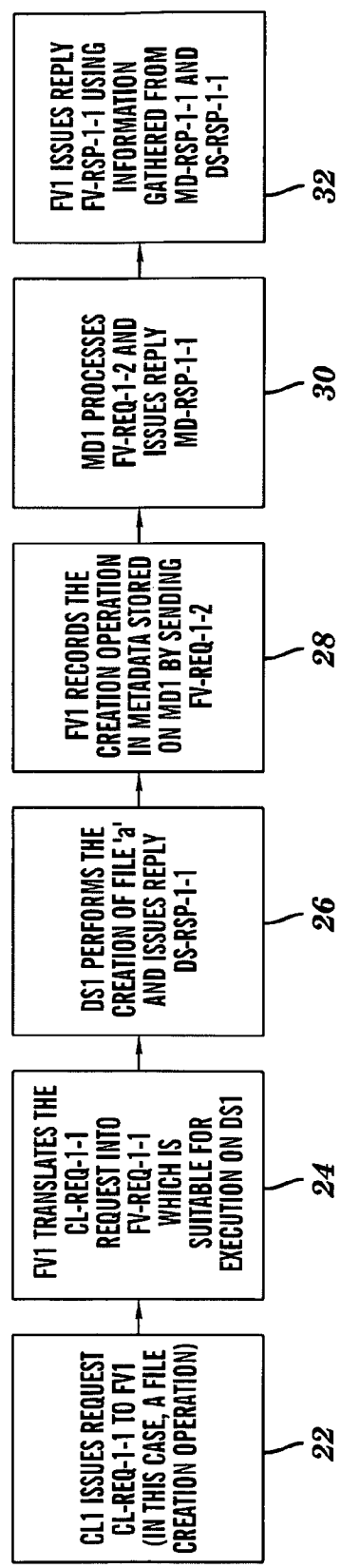
FIG. 2B is a flow chart of the example of the method for processing requests with file virtualization illustrated in FIG. 2A.

Referring now to FIGS. 2A and 2B, an example of a method for processing requests with a file virtualization is described below. In step 22, client system 12 (also known as CL1) issues a request CL-REQ-1-1 for a file creation operation of a file 'a' to file virtualization system 14 (also known as FV1), although other types and numbers of requests could be issued from other types and numbers of systems.

In step 24, file virtualization system 14 receives the request CL-REQ-1-1 from client system 12. Using the stored metadata, the file virtualization system 14 translates the request CL-REQ-1-1 into a file virtualization request FV-REQ-1-1 which is suitable for execution on data storage system 16(1) (also known as DS1) in which the file is actually located, although other types of requests for other systems could be received.

In step 26, data storage system 16(1) receives the request FV-REQ-1-1 from the file virtualization system 14. In response to the received request FV-REQ-1-1 the data storage system 16(1) performs the creation of file 'a' and issues reply DS-RSP-1-1 back to file virtualization system 14, although the data storage system 16(1) could perform other types and numbers of operations based on the received request.

In step 28, file virtualization system 14 receives the reply DS-RSP-1-1 from the data storage system 16(1). In response to the reply DS-RSP-1-1, the file virtualization system 14 generates metadata about the file creation operation and transmits a FV-REQ-1-2 request to metadata storage system 18 (also known as MD1) to record this generated metadata.

In step 30, metadata storage system 18 receives the FV-REQ-1-2 request and stores the generated metadata. Once the FV-REQ-1-2 request is processed, the metadata storage system 18 issues a reply MD-RSP-1-1 to the file virtualization system 14.

In step 32, file virtualization system 14 receives the reply MD-RSP-1-1 from the metadata storage system 18. Next, the file virtualization system 14 using information gathered from the reply MD-RSP-1-1 and the reply DS-RSP-1-1 generates a file virtualization reply FV-RSP-1-1 and issues the reply FV-RSP-1-1 back to client system 12. The file virtualization system 14 also updates the stored file virtualization configuration record to reflect this completed operation.

Figure 3A:
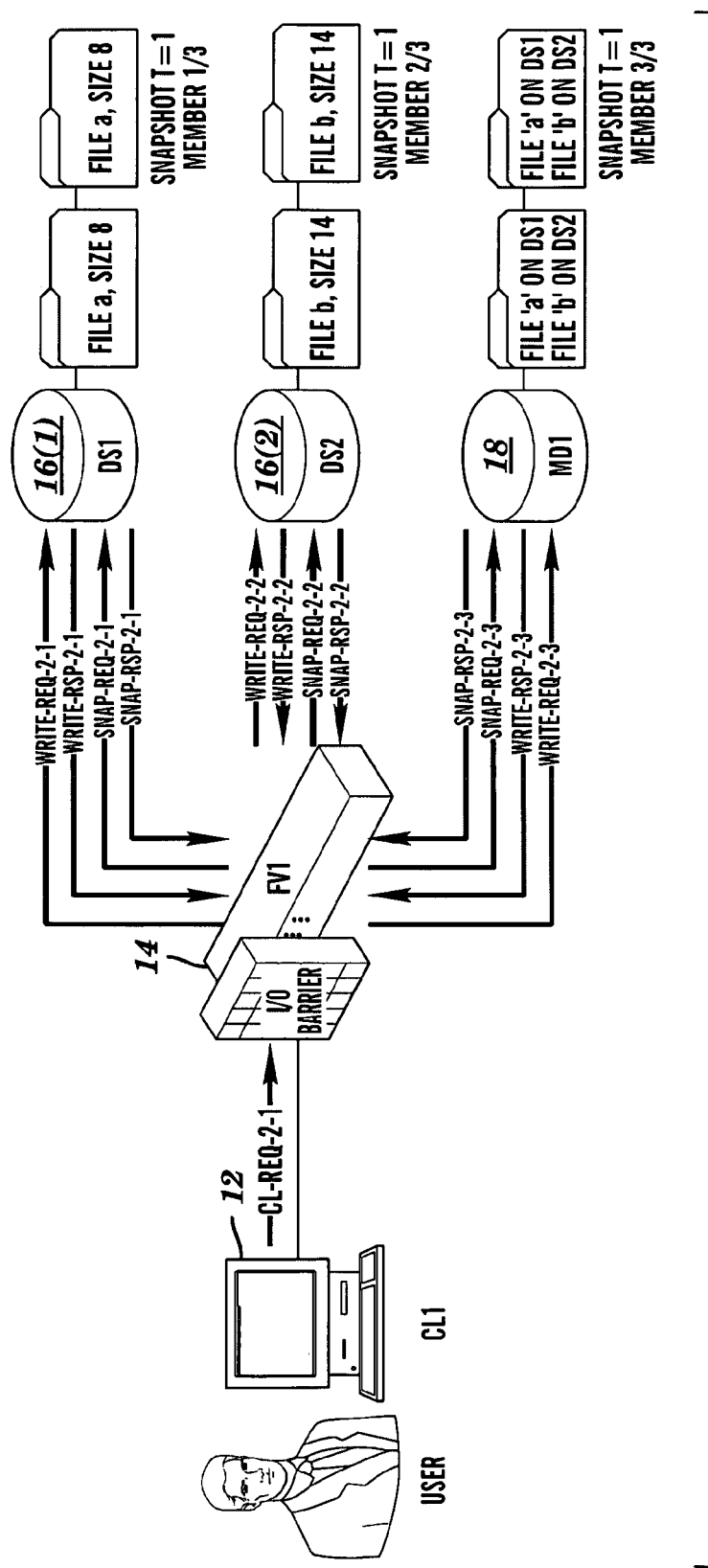
FIG. 3A is a functional block diagram of an example of a method for generating one or more unified virtual snapshots.
Figure 3B:
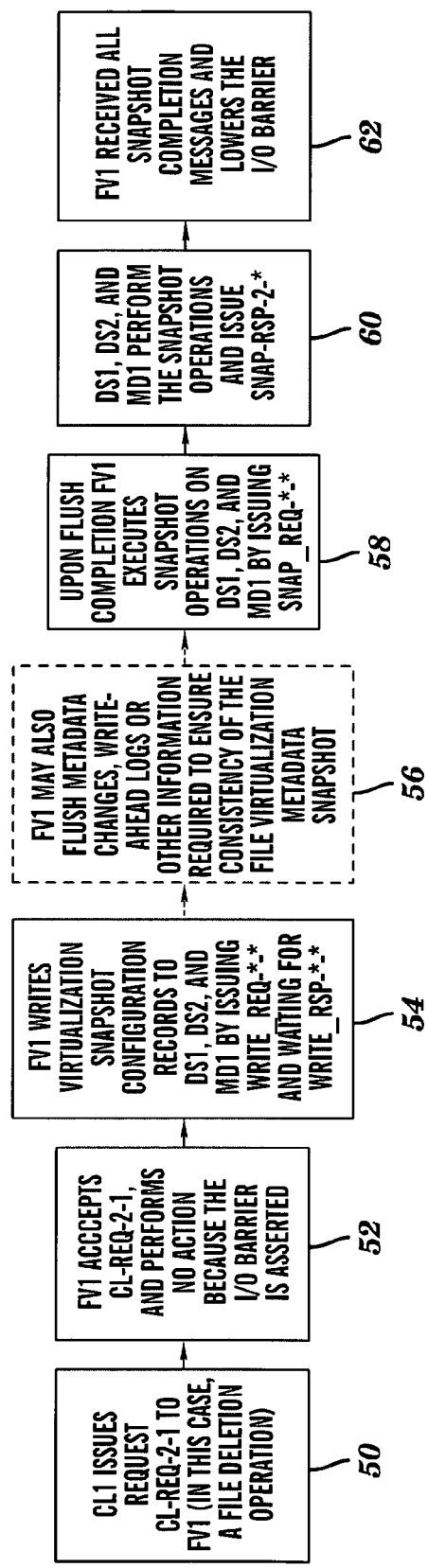
FIG. 3B is a flow chart of the example of the method for generating one or more unified virtual snapshots illustrated in FIG. 3A.

Referring now to FIGS. 3A and 3B, an example of a method for generating one or more unified virtual snapshots is described below. In step 50, client system 12 issues request CL-REQ-2-1 for a file deletion operation of file 'a' to file virtualization system 14, although other types and numbers of requests could be issued from other types and numbers of systems.

In step 52, file virtualization system 14 accepts the request CL-REQ-2-1 from the client system 12, although other types and numbers of requests could be received. Since at this time an I/O barrier is asserted, the file virtualization system 14 performs no action at this time on the request CL-REQ-2-1 from the client system 12, although once the I/O barrier is removed the file virtualization system 14 will process the request.

In step 54, while the I/O barrier is asserted, the file virtualization system 14 generates and transmits a write request WRITE_REQ_2_* to each of the data storage systems 16(1) and 16(2) and the metadata storage system 18 to write the virtualization snapshot configuration record persistent storage, although other types and numbers of requests can be transmitted to other types and numbers of systems. More specifically, in this particular example the file virtualization system 14 generates and transmits a write request WRITE_REQ_2_1 to data storage system 16(1), a write request WRITE_REQ_2_2 to data storage system 16(2), and a WRITE_REQ_2_3 to metadata storage system 18 to each write the virtualization snapshot configuration record in persistent storage.

Once the virtualization snapshot configuration record is written in persistent storage, each of the data storage systems 16(1) and 16(2) and the metadata storage system 18 generates and transmits a response WRITE_RSP_2_* to the file virtualization system 14, although other types and numbers of responses can be transmitted to other types and numbers of systems. More specifically, in this particular example data storage system 16(1) generates and transmits a WRITE_RSP_2_1, the data storage system 16(2) generates and transmits a WRITE_RSP_2_2, and the metadata storage system 18 generates and transmits a WRITE_RSP_2_3 to the file virtualization system 12 once the virtualization snapshot configuration record is written in persistent storage in each storage system.

In step 56, file virtualization system 14 optionally flushes metadata changes, write ahead logs, and any other information required to ensure consistency with the file virtualization metadata snapshot, although the file virtualization system 14 may perform other types and numbers of operations.

In step 58 once the optional flush operations described above in step 56 are completed, the file virtualization system 14 invokes the execution of snapshot operations on data storage systems 16(1) and 16(2) and metadata storage system 18 by generating and transmitting snapshot requests SNAP_REQ_2_*, although the snapshot operations can be invoked in other manners and physical snapshots can be taken in other types and numbers of systems. More specifically, in this particular example file virtualization system 14 generates and transmits request SNAP_REQ_2_1 to data storage systems 16(1) to take a physical snapshot, request SNAP_REQ_2_2 to data storage systems 16(2) to take a physical snapshot, and request SNAP_REQ_2_3 to data storage systems 18 to take a physical snapshot.

In step 60, the data storage systems 16(1) and 16(2) and the metadata storage system 18 each receive and process the requests SNAP_REQ_2_, SNAP_REQ_2_3, and SNAP_REQ_2_3, respectively, to perform a physical snapshot operation to capture a physical snapshot in each of the data storage systems 16(1) and 16(2) and the metadata storage system 18.

Once the physical snapshots have been taken, the data storage systems 16(1) and 16(2) and the metadata storage system 18 each generate and transmit a response SNAP-RSP-2-* when each of the physical snapshots at the data storage systems 16(1) and 16(2) and the metadata storage system 18 have been taken, although other types and numbers of responses can be transmitted to other types and numbers of systems. More specifically, in this particular example data storage system 16(1) generates and transmits a SNAP-RSP-2-1, the data storage system 16(2) generates and transmits a SNAP-RSP-2-2, and the metadata storage system 18 generates and transmits a SNAP-RSP-2-3 to the file virtualization system 12 when each of the physical snapshots at the data storage systems 16(1) and 16(2) and the metadata storage system 18 have been taken.

In step 62, file virtualization system 14 receives completion notifications from data storage systems 16(1) and 16(2) and metadata storage system 18 indicating that the physical snapshots are completed, i.e. the data and metadata are consistent as of the point of time the I/O barrier has been asserted, and then records completion of the unified virtual snapshot. Once all of the responses SNAP-RSP-2-* have been received, the file virtualization system 14, lowers the asserted I/O barrier and processes request CL-REQ-2-1 as well as any other requests.

Figure 4A:
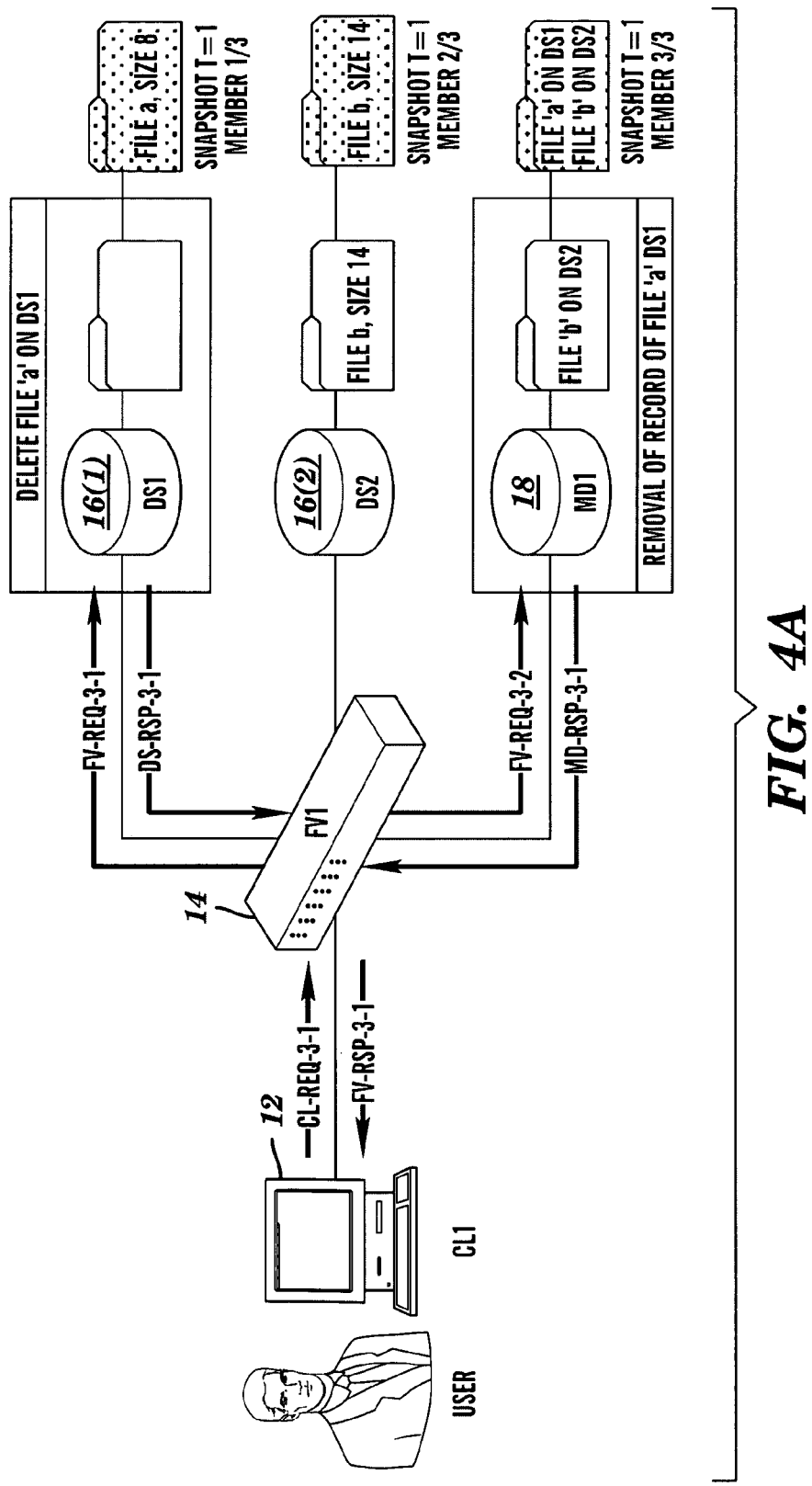
FIG. 4A is a functional block diagram of a method for processing requests with file virtualization after the creation of one or more unified virtual snapshots.
Figure 4B:
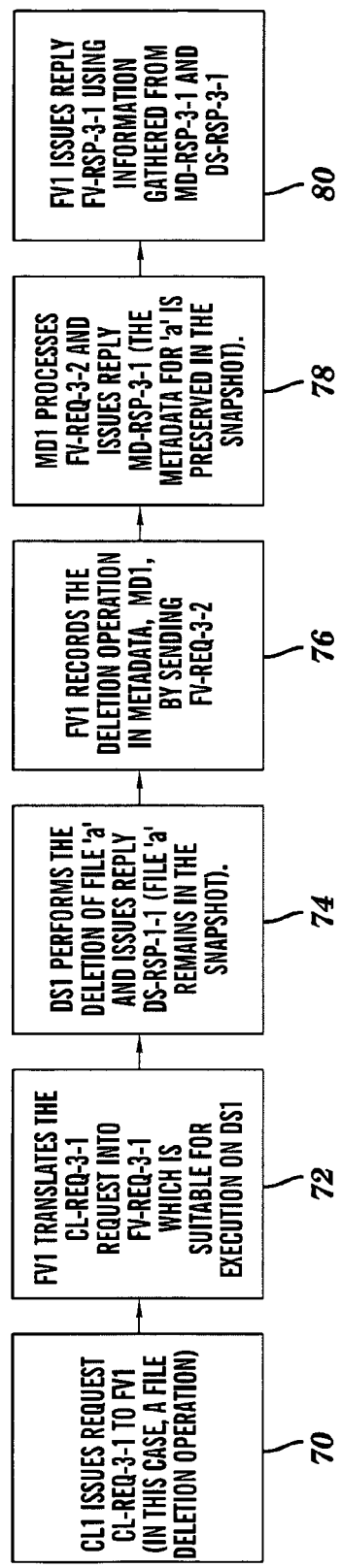
FIG. 4B is a flow chart of the example of the method for processing requests with file virtualization after the creation of one or more unified virtual snapshots illustrated in FIG. 4A.

Referring to FIGS. 4A and 4B, an example of a method for processing requests with a file virtualization after the creation of one or more unified virtual snapshots is described below. In step 70, client system 12 issues request CL-REQ-3-1 for a file deletion operation of file 'a' to file virtualization system 14, although other types and numbers of requests could be issued from other types and numbers of systems.

In step 72, file virtualization system 14 receives the request CL-REQ-3-1 from client system 12. Using the stored metadata, the file virtualization system 14 translates the request CL-REQ-3-1 into a file virtualization request FV-REQ-3-1 which is suitable for execution on data storage system 16(1) in which the file is actually located, although other types of requests for other systems could be received.

In step 74, data storage system 16(1) receives the request FV-REQ-3-1 request from the file virtualization system 14. In response to the received request FV-REQ-3-1, the data storage system 16(1) performs the deletion of file 'a' and issues reply DS-RSP-3-1 back to file virtualization system 14, although the data storage system 16(1) could perform other types and numbers of operations based on the received request. Although deleted by this operation, file 'a' remains in the unified virtual snapshot generated as described with reference to FIGS. 3A and 3B.

In step 76, file virtualization system 14 receives the reply DS-RSP-3-1 from the data storage system 16(1). In response to the reply DS-RSP-3-1, the file virtualization system 14 generates metadata about the file deletion operation and transmits a FV-REQ-3-2 request to metadata storage system 18 to record this generated metadata In step 78, metadata storage system 18 receives the request FV-REQ-3-2 and updates the metadata stored on metadata storage system 18 to reflect the deletion of file 'a', although other types and numbers of updates could be recorded. Once the FV-REQ-3-2 request is processed, the metadata storage system 18 issues a reply MD-RSP-3-1 to the file virtualization system 14.

In step 80, file virtualization system 14 receives the reply MD-RSP-3-1 from the metadata storage system 18. Next, the file virtualization system 14 using information gathered from the reply MD-RSP-3-1 and the reply DS-RSP-3-1 generates and issues a file virtualization reply FV-RSP-3-1 back to client system 12.

Figure 5A:
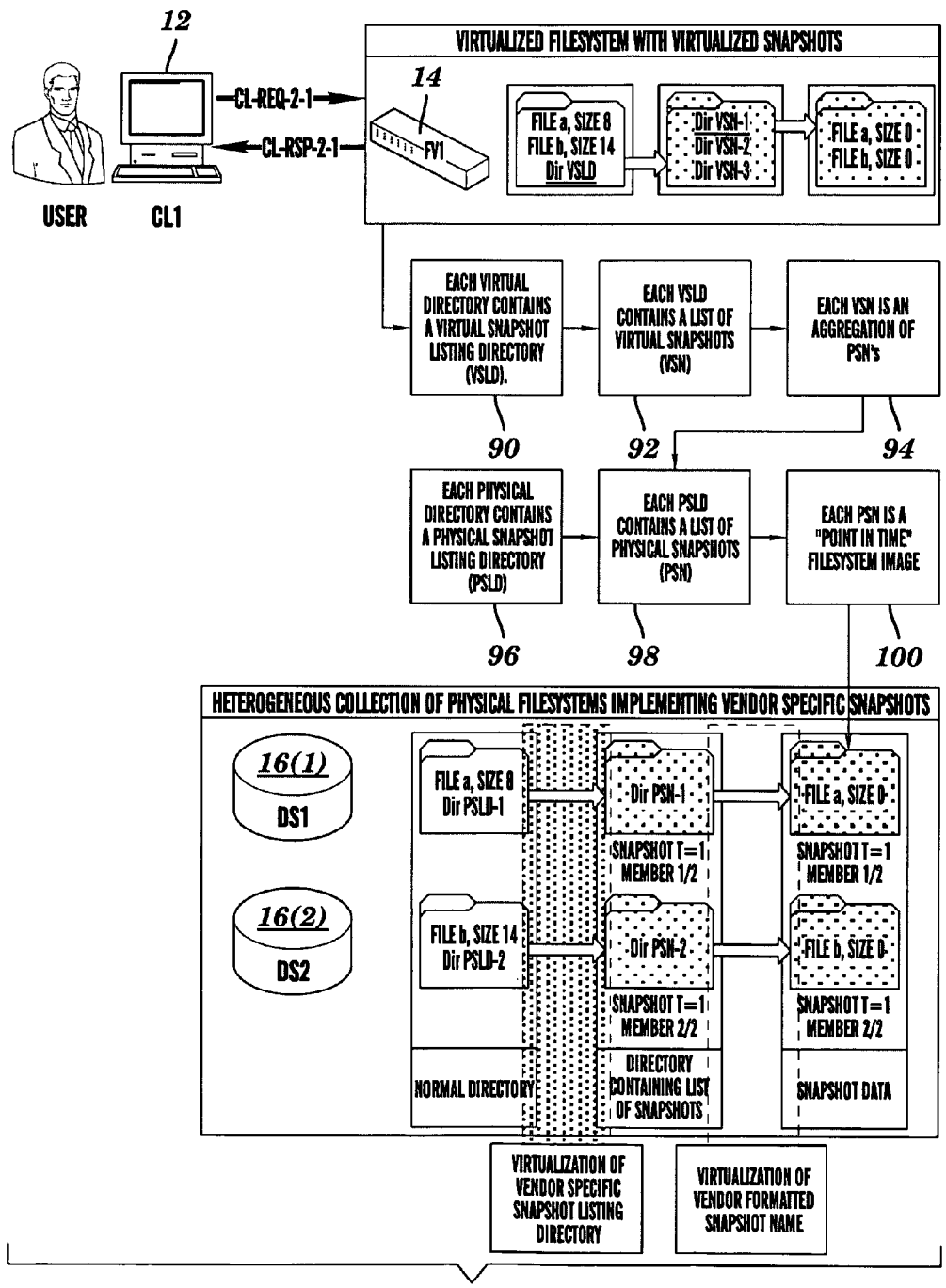
FIG. 5A is a functional block diagram of the hierarchy of unified virtual snapshots and physical snapshots.

An example of the hierarchy of unified virtual snapshots and physical snapshots is illustrated in the functional block diagram in FIG. 5A and is described below. As set forth in functional block 90, each virtual directory contains a virtual snapshot listing directory (VSLD). As set forth in functional block 92, each VSLD contains a list of virtual snapshots (VSN). As set forth in functional block 94, each VSN is an aggregation of physical snapshots (PSNs). As set forth in functional block 96, each Physical directory contains a physical snapshot listing directory (PSLD). As set forth in functional block 98, each PSLD contains a list of physical snapshots (PSN). As set forth in functional block 100, each PSN is a "point in time" image of the file system, such as of data storage system 16(1), data storage system 16(2), or metadata storage system 18, by way of example only.

Figure 5B:
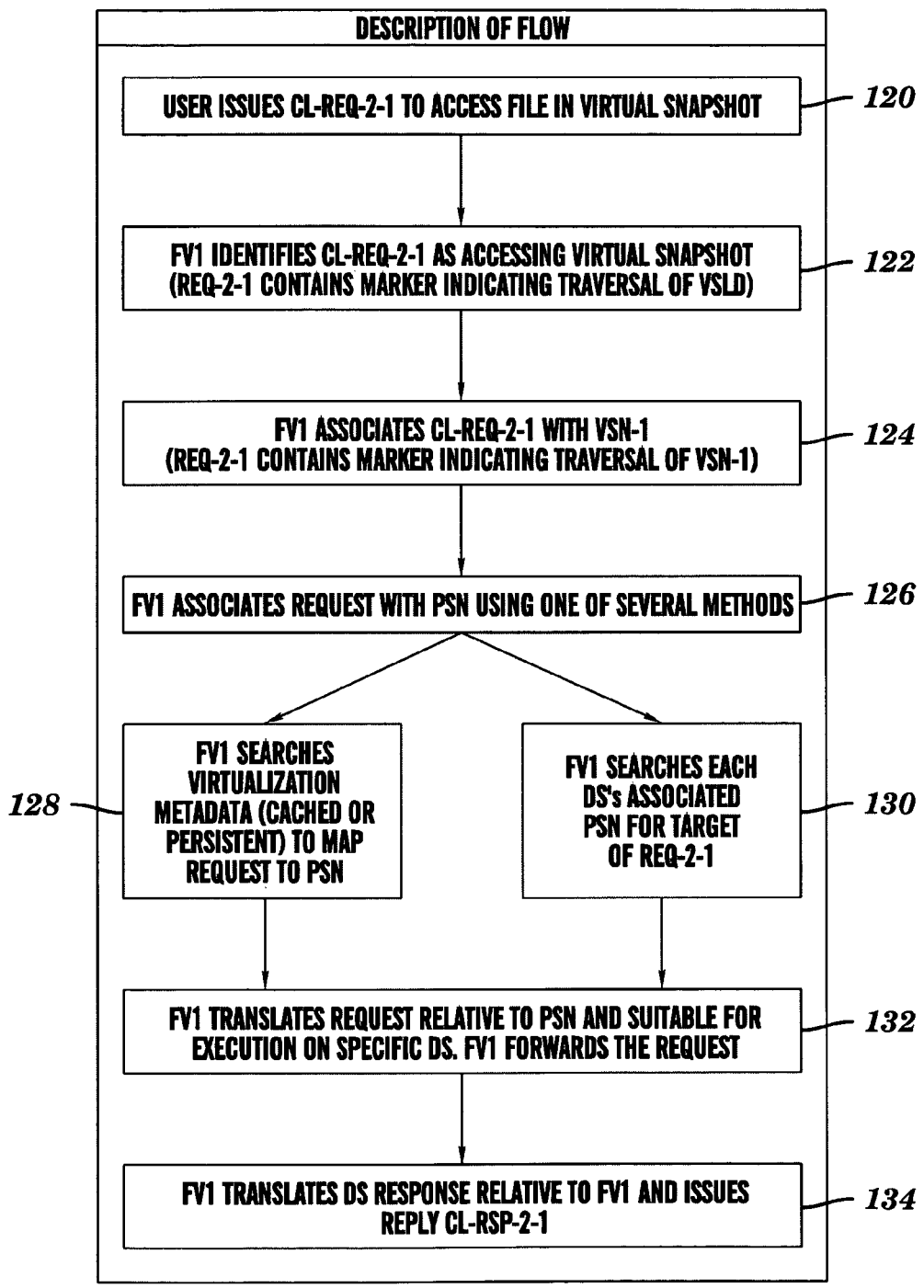
FIG. 5B is a flow chart of the example of the method for recovering content in a heterogeneous storage system.

An example of a method for recovering content in a heterogeneous storage system is illustrated in FIG. 5B and is described below. In step 120, the client system 12 generates and issues a request CL-REQ-2-1 to file virtualization system 14 to access a file in the unified virtual snapshot, although other types and numbers of requests could be issued.

In step 122, the file virtualization system 14 receives the request CL-REQ-2-1 from client system 12, although other types and numbers of requests could be received. The file virtualization system 14 processes the request CL-REQ-2-1 which includes a marker indicating a traversal of a virtual snapshot listing directory, although in response to the request the file virtualization system 14 could have other types and numbers of indicators. By way of example only, the request could have a marker which indicated a search of the virtual snapshot listing directory was needed to identify the virtual snapshot or the absence of a marker could indicate the need for a search. If a search is indicated by processing the request CL-REQ-2-1, the file virtualization system 14 identifies the virtual snapshot in the virtual snapshot listing based on one or more factors, such as a particular date range in the request, although other manners for identifying the virtual snapshot can be used.

In step 124, the file virtualization system 14 associates request CL-REQ-2-1 with the identified virtual snapshot VSN-1 based on data in the processed request CL-REQ-2-1, such as a specific identification of the virtual snapshot VSN-1, although other manners for identifying the virtual snapshot can be used.

In step 126, based on data in the request CL-REQ-2-1, the file virtualization system 14 determines which of two methods for associating the request CL-REQ-2-1 with one of the captured physical snapshots of data storage system 16(1), data storage system 16(2), and metadata storage system 18 to use, although the file virtualization system 14 could determine which method to use in other manners and could select from other types and numbers of methods In this particular example, one of these methods searches virtualization metadata (cached or persistent) to map the request to a captured physical snapshot and the other method searches the captured physical snapshot for each of the storage systems for the target of the request.

If in step 126 the file virtualization system 14 determines that the method which searches virtualization metadata should be used, then the file virtualization system 14 proceeds to step 128. In step 128, the file virtualization system 14 searches stored virtualization metadata (cached or persistent) to map the target identified in the request CL-REQ-2-1 to one of the captured physical snapshots of one of data storage system 16(1), data storage system 16(2), and metadata storage system 18. Based on the search, the file virtualization system 14 identifies one of these captured physical snapshots, although the file virtualization system can perform other operations based on the result of this search, such as generating and transmitting a message to client system 12 that the request CL-REQ-2-1 can not be completed.

If in step 126 the file virtualization system 14 determines that the method which searches the captured physical snapshots should be used, then the file virtualization system 14 proceeds to step 130. In step 130, the file virtualization system 14 searches the captured physical snapshots for each of the data storage systems 16(1) and 16(2) and metadata storage system 18 for a target identified in the request CL-REQ-2-1. Based on the search, the file virtualization system 14 either identifies one of these captured physical snapshots, although the file virtualization system 14 can perform other operations based on the result of this search, such as generating and transmitting a message to client system 12 that the request CL-REQ-2-1 can not be completed.

In step 132, once the captured physical snapshot has been identified, the file virtualization system 14 translates the request CL-REQ-2-1 in a format suitable for execution on the data storage system 16(1) or data storage system 16(2) from which the identified captured physical snapshot was taken. Once the request CL-REQ-2-1 has been translated, the file virtualization system 14 forwards the translated request CL-REQ-2-1 to the data storage system 16(1) or the data storage system 16(2) from which the identified captured physical snapshot was taken. The data storage system 16(1) or data storage system 16(2) from which the identified captured physical snapshot was taken processes the translated request CL-REQ-2-1, executes any operations, and generates and transmits a response back to the file virtualization system 14, although other types and numbers of operations could be performed based on the received translated request.

In step 134, the file virtualization system 14 translates the response from the data storage system 16(1), data storage system 16(2), or metadata storage system 18 which processed the translated request CL-REQ-2-1 and issues a reply back to the client system 12, although the file virtualization system 14 could perform other types and numbers of operations based on the received response.

Accordingly, as illustrated by the description herein the present invention provides a number of advantages including providing a unified virtual snapshot from a plurality of physical snapshots of contents of file systems distributed across several independent, network storage devices of dissimilar make and model. Additionally, the present invention provides a method and system which enables the use of snapshots in environments that implement file virtualization. Further, the present invention captures and generates snapshots which can be utilized to re-assemble contents of file systems with or without the file virtualization system.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for generating a unified virtual snapshot, the method comprising:

generating, at a file virtualization device, a uniquely identifiable virtual snapshot configuration record identifying each of a plurality of independent data storage systems in a heterogeneous storage network system, wherein at least one of the independent data storage systems is configured to store metadata associated with content stored by one or more of the independent data storage systems;

storing, with the file virtualization device, the virtual snapshot configuration record at each of the independent data storage systems;

invoking, with the file virtualization device, a capture of a plurality of physical snapshots of each of the independent data storage systems, wherein each of the physical snapshots comprises the virtual snapshot configuration record;

mapping, at the file virtualization device, the captured plurality of physical snapshots together to generate the unified virtual snapshot; and storing, with the file virtualization device, the generated unified virtual snapshot.

2. The method as set forth in claim 1 further comprising suspending, with the file virtualization device, data storage related communications between one or more network systems and the plurality of independent data storage systems during at least the invoking step.

3. The method as set forth in claim 2 further comprising resuming, with the file virtualization device, data storage related communications between the one or more network systems and the plurality of independent data storage systems upon the generation of the unified virtual snapshot.

4. The method as set forth in claim 3 wherein the suspending further comprises storing data storage related communications between the one or more network systems and the plurality of data storage systems received during the suspension until data storage related communications are resumed.

5. The method as set forth in claim 4 further comprising:

providing, with the file virtualization device, an acknowledgement of completion of at least one of the stored data storage related communications; and completing, with the file virtualization device, the at least one of the stored data storage related communications after the resuming.

6. The method as set forth in claim 1 further comprising recovering, with the file virtualization device, content in at least one of the plurality of independent data storage systems with the generated unified virtual snapshot.

7. The method as set forth in claim 1, wherein the virtual snapshot configuration record is configured to allow locating a particular file or directory in one or more of the independent data storage systems when a format of metadata stored in one of the independent data storage systems is known.

8. A non-transitory computer readable medium having stored thereon instructions for generating a unified virtual snapshot comprising machine executable code which when executed by at least one processor, causes the processor to perform the steps comprising:
generating a uniquely identifiable virtual snapshot configuration record identifying each of a plurality of independent data storage systems in a heterogeneous storage network system, wherein at least one of the independent data storage systems is configured to store metadata associated with content stored by one or more of the independent data storage systems;
storing the virtual snapshot configuration record at each of the independent data storage systems;
invoking a capture of a plurality of physical snapshots of each of the independent data storage systems, wherein each of the physical snapshots comprises the virtual snapshot configuration record;
mapping the captured plurality of physical snapshots together to generate the unified virtual snapshot; and
storing the generated unified virtual snapshot.

9. The medium as set forth in claim 8 further having stored thereon instructions that when executed by the at least one processor cause the processor to perform steps further comprising suspending data storage related communications between one or more network systems and the plurality of independent data storage systems during at least the invoking step.

10. The medium as set forth in claim 9 further having stored thereon instructions that when executed by the at least one processor cause the processor to perform steps further comprising resuming data storage related communications between the one or more network systems and the plurality of independent data storage systems upon the generation of the unified virtual snapshot.

11. The medium as set forth in claim 10 wherein the suspending further comprises storing data storage related communications between one or more network systems and a plurality of data storage systems received during the suspension until the data storage related communications is resumed.

12. The medium as set forth in claim 11 further having stored thereon instructions that when executed by the at least one processor cause the processor to perform steps further comprising:
providing an acknowledgement of completion of at least one of the stored data storage related communications; and
completing the at least one of the stored data storage related communications after the resuming.

13. The medium as set forth in claim 8 further having stored thereon instructions that when executed by the at least one processor cause the processor to perform steps further comprising recovering content in at least one of the plurality of independent data storage systems with the generated unified virtual snapshot.

14. The medium as set forth in claim 8 wherein the virtual snapshot configuration record is configured to allow locating a particular file or directory in one or more of the independent data storage systems when a format of metadata stored in one of the independent data storage systems is known.

15. A system that generates a unified virtual snapshot, the system comprising:
a plurality of independent data storage systems in a heterogeneous storage network system, wherein at least one of the independent data storage systems is configured to store metadata associated with content stored by one or more of the independent data storage systems;
a file virtualization device including at least one of configurable hardware logic configured to be capable of implementing and a processor coupled to a memory and configured to execute programmed instructions stored in the memory comprising:
generating a uniquely identifiable virtual snapshot configuration record identifying each of a plurality of independent data storage systems in a heterogeneous storage network system, wherein at least one of the independent data storage systems is configured to store metadata associated with content stored by one or more of the independent data storage systems;
storing the virtual snapshot configuration record at each of the independent data storage systems;
invoking a capture of a plurality of physical snapshots of each of the independent data storage systems, wherein each of the physical snapshots comprises the virtual snapshot configuration record;
mapping the captured plurality of physical snapshots together to generate the unified virtual snapshot and storing the generated unified virtual snapshot.

16. The system as set forth in claim 15 wherein at least one of the configurable hardware logic is further configured to be capable or the processor coupled to the memory is further configured to execute programmed instructions stored in the memory further comprising suspending data storage related communications between one or more network systems and the plurality of independent data storage systems during at least the invoking step.

17. The system as set forth in claim 16 wherein at least one of the configurable hardware logic is further configured to be capable or the processor coupled to the memory is further configured to execute programmed instructions stored in the memory further comprising resuming data storage related communications between one or more network systems and the plurality of independent data storage systems upon the generation of the unified virtual snapshot.

18. The system as set forth in claim 17 wherein at least one of the configurable hardware logic is further configured to be capable or the processor coupled to the memory is further configured to execute programmed instructions stored in the memory further comprising storing data storage related communications between one or more network systems and a plurality of data storage systems received during the suspension until the data storage related communications are resumed.

19. The system as set forth in claim 18 wherein at least one of the configurable hardware logic is further configured to be capable or the processor coupled to the memory is further configured to execute programmed instructions stored in the memory further comprising providing an acknowledgement of completion of at least one of the stored data storage related communications and completing the at least one of the stored data storage related communications after resuming.

20. The system as set forth in claim 15 wherein at least one of the configurable hardware logic is further configured to be capable or the processor coupled to the memory is further configured to execute programmed instructions stored in the memory further comprising recovering content in at least one of the plurality of independent data storage systems with the generated unified virtual snapshot.

21. The system as set forth in claim 15 wherein the virtual snapshot configuration record is configured to allow locating a particular file or directory in one or more of the independent data storage systems when a format of metadata stored in one of the independent data storage systems is known.

22. A file virtualization device, comprising:
at least one of configurable hardware logic configured to be capable of implementing or a processor coupled to a memory and configured to execute programmed instructions stored in the memory comprising:
generating a uniquely identifiable virtual snapshot configuration record identifying each of a plurality of independent data storage systems in a heterogeneous storage network system, wherein at least one of the independent data storage systems is configured to store metadata associated with content stored by one or more of the independent data storage systems;
storing the virtual snapshot configuration record at each of the independent data storage systems;
invoking a capture of a plurality of physical snapshots of each of the independent data storage systems, wherein each of the physical snapshots comprises the virtual snapshot configuration record;
mapping the captured plurality of physical snapshots together to generate the unified virtual snapshot; and
storing the generated unified virtual snapshot.

23. The device as set forth in claim 22, wherein at least one of the configurable hardware logic is further configured to be capable or the processor coupled to the memory is further configured to execute programmed instructions stored in the memory further comprising suspending data storage related communications between one or more network systems and the plurality of independent data storage systems during at least the invoking step.

24. The device as set forth in claim 23, wherein at least one of the configurable hardware logic is further configured to be capable or the processor coupled to the memory is further configured to execute programmed instructions stored in the memory further comprising resuming data storage related communications between one or more network systems and the plurality of independent data storage systems upon the generation of the unified virtual snapshot.

25. The device as set forth in claim 24, wherein at least one of the configurable hardware logic is further configured to be capable or the processor coupled to the memory is further configured to execute programmed instructions stored in the memory further comprising storing data storage related communications between one or more network systems and a plurality of data storage systems received during the suspension until the data storage related communications are resumed.

26. The device as set forth in claim 25, wherein at least one of the configurable hardware logic is further configured to be capable or the processor coupled to the memory is further configured to execute programmed instructions stored in the memory further comprising providing an acknowledgement of completion of at least one of the stored data storage related communications and completing the at least one of the stored data storage related communications after resuming.

27. The device as set forth in claim 22, wherein at least one of the configurable hardware logic is further configured to be capable or the processor coupled to the memory is further configured to execute programmed instructions stored in the memory further comprising recovering content in at least one of the plurality of independent data storage systems with the generated unified virtual snapshot.

28. The device as set forth in claim 22, wherein the virtual snapshot configuration record is configured to allow locating a particular file or directory in one or more of the independent data storage systems when a format of metadata stored in one of the independent data storage systems is known.

* * * * *